Jan. 9, 1951     R. H. HUNTER ET AL     2,537,898
FILTER UNIT
Filed Nov. 5, 1948
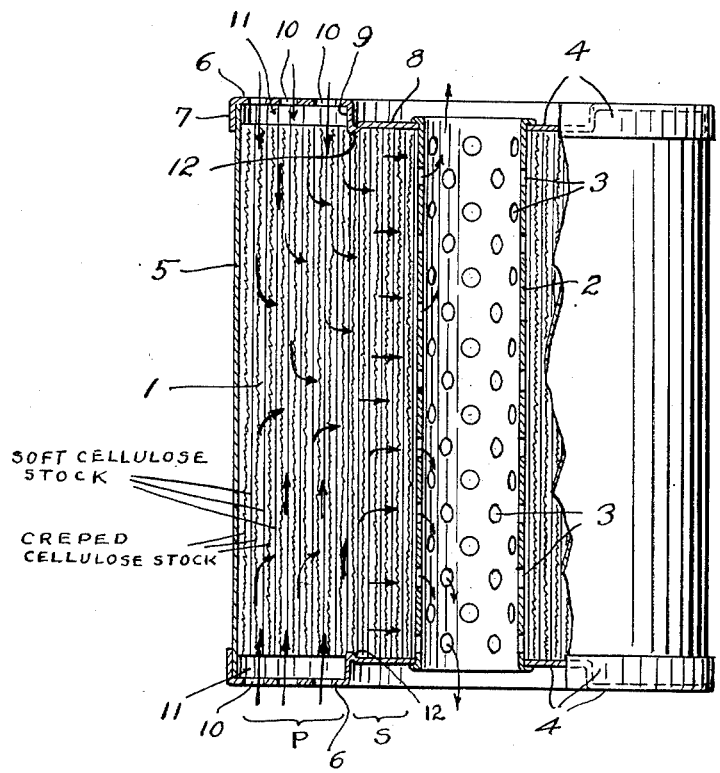
INVENTORS
ROBERT H. HUNTER
ELMER J. KASPER
BY
George M. Soule
ATTORNEY Patented Jan. 9, 1951

2,537,898

UNITED STATES PATENT OFFICE 2,537,898

FILTER UNIT

Robert H. Hunter, Gate Mills, and Elmer J. Kasper, Highlands Heights, Ohio; said Kasper assignor to said Hunter Application November 5, 1948, Serial No. 58,382

4 Claims. (Cl. 210—169)

This invention relates to a filter unit or filler element of the replaceable cartridge type and which uses the filtration principles taught by the application of Robert H. Hunter, Serial No. 759,727 filed July 9, 1947. That application shows concentric primary and secondary filtration bodies of laminated (roll-formed) foraminous sheet stock, the primary body intimately enveloping the secondary body and being provided with raw filtrate introduction manifolds or chambers in the form of holes piercing the sheets of the primary body. The holes enabled introduction of the raw filtrate for dispersion between and over large areas of mutually adjacent primary body sheet stock portions throughout said primary body. The free edges of the sheet stock of the secondary body are sealed against egress of filtrate from between the sheet margins, forcing the filtrate which penetrates the generally imperforate portions of the primary body to pass successively through and only through the secondary body sheets.

It was found expensive to perforate the sheet stock in order to expose cut edges of the various plies of stock; and the present invention primarily aims to reduce that expense in a filter unit operating essentially as described above and as claimed in said application. Other objectives will become apparent from the following description.

The drawing shows one form of the filter unit or filler cartridge hereof partly in central section and partly in side elevation.

The primary filter body, as illustrated, is the outer annular portion P of the roll 1 of foraminous stock which is or can be exactly the same as described in said application. The inner annular portion S is the secondary filter body. The stock is preferably alternate layers of soft and creped cellulose sheets wound continuously as double ply toilet paper would be formed into a roll. The soft cellulose stock is recommended principally for water absorption, hence the creped stock (preferably) is wet strengthened as described in said application. The creping treatment of that layer assures the presence of a multiplicity of freely intercommunicating channels (which are large as compared to the microscopic interstices through the stock sheets), although the sheet strips composing the roll are tightly wound. The plies of the secondary filter body are preferably more tightly wound or compacted than the primary body plies. The plies of the primary filter body P can differ materially from those of the secondary body S or the same stock can be used throughout the roll as when wound from continuous strips.

The sheet stock envelops a central substantially rigid tube 2 having perforations 3 to serve (in the illustrated form) as outlets for the cleansed filtrate. End caps or walls of identical shell construction are shown at 4. The caps are preferably sheet metal suitably joined to the tube 2 or to an outer scuff shell or cover 5 of imperforate metal or tough paper. The radially outward portion 6 of each cap may be flanged at 7 to telescope the scuff shell. Said portions 6 are stepped outwardly from the inner annular portions 8 as by the shoulders 9 and perforated at 10 to provide inlet openings leading to filtrate introduction and distribution chambers 11. The chambers 11 through the perforations 10 and suitable enveloping housling construction, not shown, are supplied simultaneously with filtrate at equal pressure. Such housing, as usual, has at least one outlet sealed around an associated end of the tube 2 to conduct cleansed filtrate from the cartridge.

The marginal edges of the foraminous plies of the secondary body portion S are suitably sealed at both ends of the roll. Sealing material (not shown) may be applied to the end surfaces of the roll which registers with portions 8 and said portions serve to maintain pressure on the sealing material.

Flow barrier ribs 12 on the caps indent the material of the roll further to prevent egress of filtrate from the secondary filter body edgewise of the sheet stock.

The arrangement shown may obviously be reversed if it is desired to have the indicated flow paths reversed, as from inside to outside of the filter body roll 1. Operation of the illustrated arrangement is as follows:

Equal pressure maintained in the two chambers 11 causes the raw filtrate to penetrate the primary filter body P deeply between its sheets. The dirt and other foreign matter, including water in case the filtrate is engine oil, can thus largely be entrained or absorbed by the sheets in the relatively wide interstitial spaces afforded by the rolled construction and over remarkably wide areas (15,000 to 20,000 square inches in average size filter cartridges). The finer particles are picked up partly by adsorption as the filtrate is forced to pass through the sheet stock toward the secondary body S. For convenience the edgewise (parallel to sheet stock) filtration treatment which is largely a coarse straining operation can be considered the primary filtration stage, all of which is accomplished in the primary annular body P. Through-sheet or secondary filtration stage treatment is accomplished both in the primary body P and secondary body S, but in the latter body substantially only the secondary treatment takes place. The filtrate must pass successively through all the sheet turns of the secondary body and cannot by-pass any of the layers thereof.

We claim:

1. A filter unit of canister or cartridge type comprising a tubular casing with annular end walls containing between its radially inner and outer walls and parallel therewith, concentrically laminated foraminous sheet stock including a primary filtration annular portion and substantially concentric secondary filtration annular portion, means for sealing the end margins of the sheets of the secondary annular portion against egress of filtrate therefrom between the sheets, means associated with one of the end walls for introducing raw filtrate to and between the edge margins of the primary filtration sheets for dispersal over large areas of the primary sheets, and means associated with the same end wall for blocking egress of such introduced filtrate from between the primary filtration sheets except through the same toward the secondary filtration portion.

2. A filter cartridge comprising inner and outer concentric tubular walls, one of perforate construction, primary and secondary annular bodies of intimately laminated foraminous sheet stock, one body intimately enveloping the other and the second body lying adjacent the perforated wall, end walls for the cartridge connecting the concentric walls, means associated with the end walls for sealing the adjacent marginal edges of the sheet stock of the secondary body against egress of filtrate from the secondary body between said margins, the end wall portions axially opposite the primary body being of perforate construction for simultaneous introduction of raw filtrate to the end margins of the sheet stock of the primary body at both its ends for dispersal of the raw filtrate between the layers of the primary body generally in opposite directions from each end of said body.

3. The filter cartridge according to claim 2 wherein the inner tubular wall is perforate and the end walls have annular perforate portions in axial alignment with the primary body and spaced therefrom to provide annular distribution chambers.

4. The filter cartridge according to claim 2 wherein the end walls are substantially rigid shells each with annular relatively stepped concentric portions, one portion lying directly adjacent the secondary body sheet stock substantially to seal the sheet edges and the other in spaced relation to the primary body stock to provide raw filtrate introduction chambers.

ROBERT H. HUNTER.
ELMER J. KASPER.

REFERENCES CITED

The following references are of record in the file of this patent:

UNITED STATES PATENTS

| Number | Name | Date |
|---|---|---|
| 1,690,564 | Ward | Nov. 6, 1928 |
| 2,452,407 | Walker | Oct. 26, 1948 |